US012603537B2

(12) United States Patent
Kim et al.

(10) Patent No.: US 12,603,537 B2
(45) Date of Patent: Apr. 14, 2026

(54) CLOTHES TREATMENT APPARATUS

(71) Applicant: LG Electronics Inc., Seoul (KR)

(72) Inventors: Younghun Kim, Seoul (KR); Uikun Hwang, Seoul (KR); Yongdeok Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 219 days.

(21) Appl. No.: 18/280,003

(22) PCT Filed: Feb. 28, 2022

(86) PCT No.: PCT/KR2022/002866
§ 371 (c)(1),
(2) Date: Sep. 1, 2023

(87) PCT Pub. No.: WO2022/186571
PCT Pub. Date: Sep. 9, 2022

(65) Prior Publication Data
US 2024/0154487 A1     May 9, 2024

(30) Foreign Application Priority Data

Mar. 3, 2021     (KR) ........................ 10-2021-0028336

(51) Int. Cl.
*H02K 5/16*          (2006.01)
*D06F 37/30*         (2020.01)
(52) U.S. Cl.
CPC ............. *H02K 5/16* (2013.01); *D06F 37/304* (2013.01)
(58) Field of Classification Search
None
See application file for complete search history.

(56) References Cited

U.S. PATENT DOCUMENTS 10,301,757 B2     5/2019  Kim
2012/0006068 A1    1/2012  Song et al.
(Continued)

FOREIGN PATENT DOCUMENTS

JP      2006-314562       11/2006
KR    1020060062185  A     6/2006
(Continued)

OTHER PUBLICATIONS

JP 2006314562 A Espacenet translation, Drum Type Washing Machine, Komori (Year: 2006).*
(Continued)

*Primary Examiner* — Cristi J Tate-Sims
(74) *Attorney, Agent, or Firm* — Fish & Richardson P.C.

(57)          ABSTRACT

A clothes treatment apparatus includes: a cabinet; a tub; a drum; a driving part; a rotary shaft connected to the drum; and a bearing housing, which is fixed to the tub and rotatably supports the rotary shaft. The driving part includes a stator that is coupled to the bearing housing and includes an input terminal positioned on one surface thereof facing the bearing housing, so as to receive external power. The bearing housing includes: a hub part in which the rotary shaft is accommodated; an extended part extended in the radial direction from the outer peripheral surface of the hub part to support the hub part at the tub; and a reinforcing part extended in the direction parallel to that of the input terminal from the outer peripheral surface of the extended part to expand the diameter of the extended part.

15 Claims, 6 Drawing Sheets

(56)  References Cited

U.S. PATENT DOCUMENTS

2012/0240637 A1* 9/2012 Lim ..................... D06F 37/304
                                                    68/140
2013/0074553 A1   3/2013 Cha

FOREIGN PATENT DOCUMENTS

KR   10-2009-0046073   5/2009
KR   10-2014-0034999   3/2014

OTHER PUBLICATIONS

Extended European Search Report in European Appln. No. 22763554.
7, mailed on Jan. 7, 2025, 10 pages.
International Search Report and Written Opinion in Appln. No.
PCT/KR2022/002866, mailed on Jun. 16, 2022, 18 pages (with
English translation).

* cited by examiner

CLOTHES TREATMENT APPARATUS

CROSS-REFERENCE TO RELATED APPLICATIONS

This application is a National Stage application under 35 U.S.C. § 371 of International Application No. PCT/KR2022/002866, filed on Feb. 28, 2022, which claims the benefit of Korean Application No. 10-2021-0028336, filed on Mar. 3, 2021. The disclosures of the prior applications are incorporated by reference in their entirety.

TECHNICAL FIELD

The present disclosure relates to a laundry treating apparatus. More specifically, the present disclosure relates to a laundry treating apparatus including a bearing housing supporting a rotation shaft.

BACKGROUND ART

A laundry treating apparatus is an apparatus that may remove dust or foreign substances attached to laundry by applying a physical force to the laundry, and includes a washing machine, a dryer, a refresher (a styler), and the like.

The washing machine is constructed to supply water and detergent to the laundry to perform a washing operation that may separate and remove the foreign substances from the laundry.

The washing machine includes a tub that accommodates water therein, a drum rotatably disposed inside the tub and accommodating the laundry therein, and a driver that rotates the drum by supplying rotational power to the drum. The driver includes a stator that generates a rotating magnetic field and a rotor that rotates by the rotating magnetic field generated by the stator. A rotational force of the rotor may be transmitted to the drum via a rotation shaft connected to the rotor.

In a case of a front loading type washing machine having an opening defined at a front surface of the washing machine, the stator may be fixed to a rear surface of the tub. In addition, the rotor may be located to surround an outer circumferential surface of the stator, and the rotation shaft connected to a center of the rotor may be connected to the drum through the stator and the rear surface of the tub.

In one example, because the tub is generally made of a synthetic resin material such as plastic, as vibrations caused by the rotation of the rotor or vibrations caused by imbalance of the laundry accommodated in the drum are applied to the tub, there is a concern that the tub may be deformed or damaged. Accordingly, the conventional laundry treating apparatus includes a bearing housing that rotatably supports the rotation shaft. The bearing housing is made of a metal material, so that the bearing housing is not easily damaged by vibrations occurred during use, and durability of the tub may be improved.

The bearing housing may be inserted into the rear surface of the tub and manufactured integrally with the tub. The bearing housing may allow the rotation shaft to be connected to the drum through the rear surface of the tub and, and may rotatably support the rotation shaft.

Among the conventional washing machines, there is one that includes the bearing housing that is inserted into the tub and integrally formed with the tub to rotatably support the rotation shaft (Korean Patent Application Publication No. 10-2017-0024252). The bearing housing includes a housing hub with the bearing mounted on an inner circumferential surface thereof to support the rotation shaft, and a plurality of housing wings extending outward in a radial direction from the housing hub. The housing wing is inserted into the tub and supports the housing hub on the tub. However, because the housing wing extends outward in the radial direction from the housing hub to form a free end, and there is no structure supporting the housing wing, it is difficult to sufficiently secure rigidity of the housing wing. Therefore, there is a risk of damage to the housing wing caused by vibrations occurred by the rotation shaft. In addition, the washing machine disclosed in the prior art literature corresponds to a top loading type washing machine in which the laundry is inserted into and withdrawn from an upper side of the drum. Therefore, a load supported by the bearing housing is relatively low compared to the front loading type washing machine. Therefore, there is a lack of demand for improving strength of the bearing housing.

In one example, when radial and ring-shaped ribs are excessively added around the housing hub to secure rigidity of the bearing housing, the rigidity of the bearing housing may be improved, but a weight of the entire bearing housing increases and materials are unnecessarily consumed. Therefore, it is necessary to add a support structure to secure the rigidity of the bearing housing, but supplement the support structure mainly in a weak section to prevent the materials from being unnecessarily consumed and derive a structure for reducing the weight of the entire bearing housing.

DISCLOSURE

Technical Problem

The present disclosure is to provide a laundry treating apparatus that may secure rigidity of a bearing housing.

In addition, the present disclosure is to provide a laundry treating apparatus that may prevent unnecessary consumption of materials by intensively reinforcing rigidity of a weak section among portions of a bearing housing.

In addition, the present disclosure is to provide a laundry treating apparatus that may prevent residual water from being generated inside a rear surface of a tub into which a bearing housing is inserted.

In addition, the present disclosure is to provide a laundry treating apparatus that may prevent a tub from being damaged by a thermal stress caused by a difference in cooling speed between the tub and a bearing housing.

In addition, the present disclosure is to provide a laundry treating apparatus that may reduce a weight of a bearing housing by omitting portions other than essential structures for securing rigidity of the bearing housing.

Technical Solutions

To solve the above problems, a bearing housing of a laundry treating apparatus according to an embodiment of the present disclosure includes a hub accommodating a rotation shaft therein, an extension extending in a radial direction from an outer circumferential surface of the hub to support the hub to a tub, and a reinforcing portion extending radially outward from an outer circumferential surface of the extension to expand a diameter of the extension.

In addition, the reinforcing portion may be disposed radially in parallel with an input terminal disposed on a stator and receiving external power.

In addition, the reinforcing portion may extend from the outer circumferential surface of the extension facing the input terminal to locally expand the diameter of the extension.

In addition, the extension may include a circumferential rib spaced apart from the hub and surrounding the hub, and a fastening portion connecting the hub and the circumferential rib to each other and to which the stator is coupled, and an angle formed by the circumferential rib and the hub may be greater than an angle formed by the ground and the rotation shaft.

In addition, as a structure that minimizes a length of a flange supporting the circumferential rib is applied, a thermal stress value may be lowered to reduce cracks of the tub.

To solve the above-mentioned problems, a laundry treating apparatus according to an embodiment of the present disclosure includes a cabinet, a tub disposed inside the cabinet to store water therein, a drum rotatably disposed inside the tub to accommodate laundry therein, a driver including a stator positioned at the rear of the tub to generate a rotating magnetic field and a rotor rotated by the rotating magnetic field, a rotation shaft connected to the rotor to rotate together with the rotor, wherein the rotation shaft extends through the tub and is connected to the drum, and a bearing housing fixed to the tub and rotatably supporting the rotation shaft, the stator is coupled to the bearing housing, and the stator includes an input terminal located on one surface thereof facing the bearing housing to receive external power, and the bearing housing includes a hub accommodating the rotation shaft therein, an extension extending in a radial direction from an outer circumferential surface of the hub to support the hub to the tub, and a reinforcing portion extending in a direction parallel to the input terminal from an outer circumferential surface of the extension to expand a diameter of the extension.

The extension may include a circumferential rib spaced apart from the hub and surrounding the hub, and a fastening portion connecting the hub and the circumferential rib to each other and to which the stator is coupled.

The extension may include an avoidance portion bent from a free end of a portion of the circumferential rib facing the input terminal to prevent interference with the input terminal, and the reinforcing portion may be disposed to be spaced apart from the avoidance portion in the radial direction.

The fastening portion may include a plurality of fastening portions, and the plurality of fastening portions may be disposed to be spaced apart from each other along a circumference of the hub, and the avoidance portion may be located between two adjacent fastening portions among the plurality of fastening portions.

The circumferential rib may include a plurality of circumferential ribs, and the plurality of circumferential ribs may be disposed to be spaced apart from each other in the radial direction, and the avoidance portion may include a plurality of avoidance portions, and the plurality of avoidance portions may be respectively disposed at the plurality of circumferential ribs.

The reinforcing portion may extend in the radial direction from an outer circumferential surface of a circumferential rib disposed at an outermost side among the plurality of circumferential ribs.

In one example, the circumferential rib may include a first circumferential rib connected to the fastening portion, and a second circumferential rib disposed to be spaced outwardly apart from the first circumferential rib in the radial direction, and the reinforcing portion may extend from an outer circumferential surface of the second circumferential rib.

The extension may include at least one support rib connecting the first circumferential rib and the second circumferential rib to each other.

The reinforcing portion may include a first extending rib extending in the radial direction from the outer circumferential surface of the second circumferential rib, a second extending rib spaced apart from the first extending rib along a circumference of the second circumferential rib and extending in the radial direction from the outer circumferential surface of the second circumferential rib, and a reinforcing rib connecting the first extending rib and the second extending rib to each other.

At least one of the first extending rib and the second extending rib may be disposed parallel to the support rib.

In one example, a distance between the circumferential rib and the hub may increase as the circumferential rib moves away from the stator.

The circumferential rib may be downwardly inclined forwards with respect to the ground.

In one example, the tub may be upwardly inclined forwards, and the bearing housing may be fixed to a rear surface of the tub and may be upwardly inclined.

The bearing housing may be upwardly inclined with respect to the ground by a first inclination angle, the circumferential rib may be inclined with respect to a center of rotation of the rotation shaft by a second inclination angle, and the second inclination angle may be greater than the first inclination angle.

In one example, the bearing housing may be inserted into the tub, but a portion of the fastening portion may be exposed from a rear surface of the tub.

Advantageous Effects

The present disclosure has the effect of providing the laundry treating apparatus that may secure the rigidity of the bearing housing.

In addition, the present disclosure has the effect of providing the laundry treating apparatus that may prevent the unnecessary consumption of the materials by intensively reinforcing the rigidity of the weak section among the portions of the bearing housing.

In addition, the present disclosure has the effect of providing the laundry treating apparatus that may prevent the residual water from being generated inside the rear surface of the tub into which the bearing housing is inserted.

In addition, the present disclosure has the effect of providing the laundry treating apparatus that may prevent the tub from being damaged by the thermal stress caused by the difference in the cooling speed between the tub and the bearing housing.

In addition, the present disclosure has the effect of providing the laundry treating apparatus that may reduce the weight of the bearing housing by omitting the portions other than the essential structures for securing the rigidity of the bearing housing.

MODE FOR INVENTION

Figure 1:
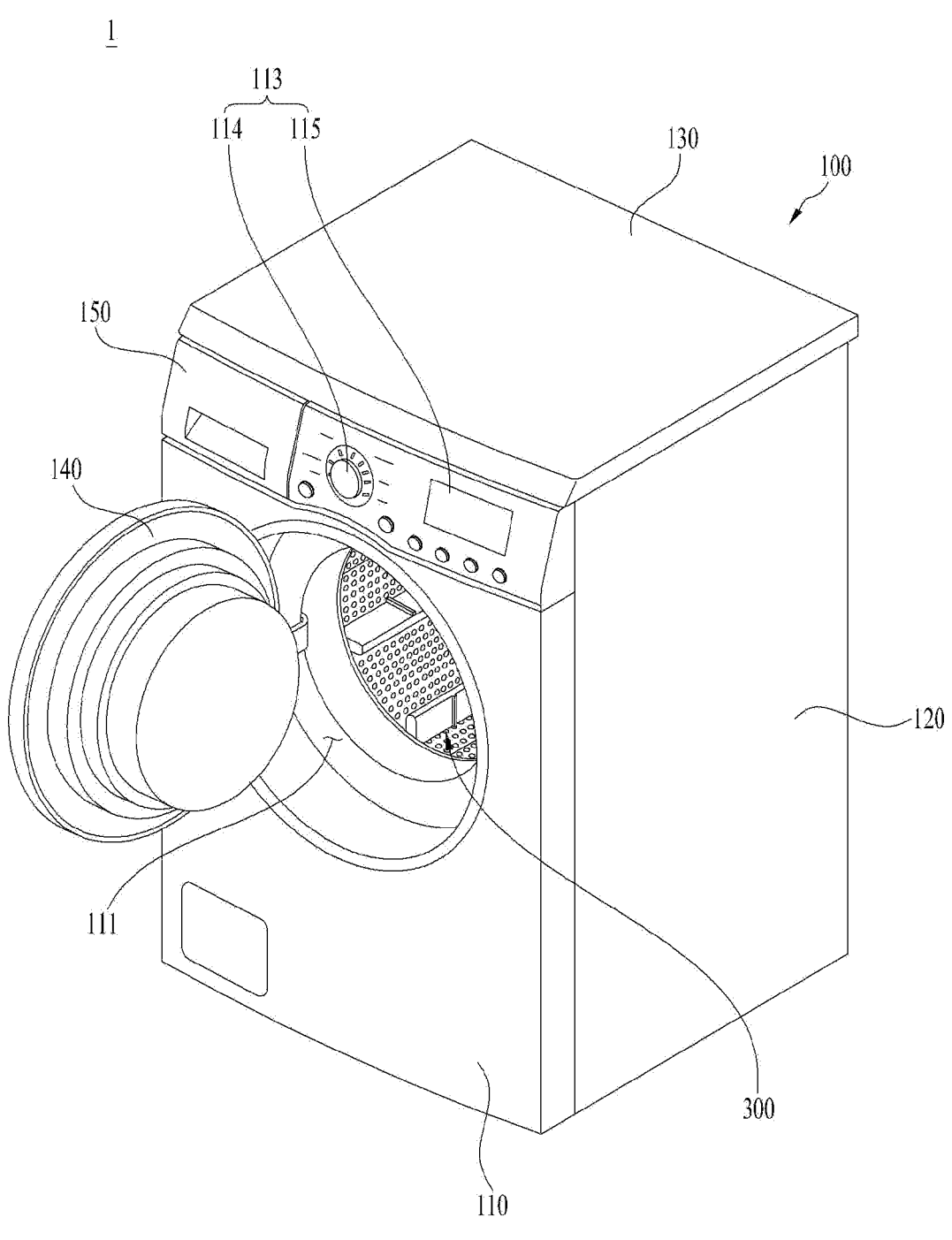
FIG. 1 shows an outer appearance of a laundry treating apparatus according to an embodiment of the present disclosure.

Hereinafter, an embodiment of the present disclosure will be described in detail with reference to the accompanying drawings such that a person having ordinary knowledge in the technical field to which the present disclosure belongs may easily implement the embodiment.

However, the present disclosure is able to be implemented in various different forms and is not limited to the embodiment described herein. In addition, in order to clearly describe the present disclosure, components irrelevant to the description are omitted in the drawings. Further, similar reference numerals are assigned to similar components throughout the specification.

Duplicate descriptions of the same components are omitted herein.

In addition, it will be understood that when a component is referred to as being 'connected to' or 'coupled to' another component herein, it may be directly connected to or coupled to the other component, or one or more intervening components may be present. On the other hand, it will be understood that when a component is referred to as being 'directly connected to' or 'directly coupled to' another component herein, there are no other intervening components.

The terminology used in the detailed description is for the purpose of describing the embodiments of the present disclosure only and is not intended to be limiting of the present disclosure.

As used herein, the singular forms 'a' and 'an' are intended to include the plural forms as well, unless the context clearly indicates otherwise.

It should be understood that the terms 'comprises', 'comprising', 'includes', and 'including' when used herein, specify the presence of the features, numbers, steps, operations, components, parts, or combinations thereof described herein, but do not preclude the presence or addition of one or more other features, numbers, steps, operations, components, or combinations thereof.

In addition, in this specification, the term 'and/or' includes a combination of a plurality of listed items or any of the plurality of listed items. In the present specification, 'A or B' may include 'A', 'B', or 'both A and B'.

FIG. 1 shows an outer appearance of a laundry treating apparatus according to an embodiment of the present disclosure.

Referring to FIG. 1, a laundry treating apparatus according to one embodiment of the present disclosure may include a cabinet 100 that forms an outer appearance of the apparatus, a tub (see FIG. 2) that is disposed inside the cabinet 100 to store water therein, and a drum 300 that is rotatably disposed inside the tub and accommodates laundry therein. The cabinet 100 includes a front panel 110 that forms a front surface of the laundry treating apparatus, a top panel 130 that forms a top surface of the apparatus, side panels 120 that form side surfaces of the apparatus, and a rear panel (not shown) that forms a rear surface of the apparatus.

A manipulation panel 113 may be installed on the front panel 110. The manipulation panel 113 may include input means 114 that receives a control command from a user and a display 115 that outputs information such as the control command selectable by the user. The control command may include a drying course or a drying option for performing a series of drying operations. A controller (not shown) that controls the internal components to execute the control command input via the input means 114 may be installed inside the cabinet 100. The controller may be connected to the components inside the laundry treating apparatus and control the corresponding components to execute the input command.

The input means 114 may include power supply request means that requests power supply for the laundry treating apparatus, course input means that enables the user to select a desired course among multiple courses, and execution request means that requests start of the course selected by the user.

The display 115 may include at least one of a display panel that may output text and figures and a speaker that may output an audio signal and sound.

In one example, the laundry treating apparatus according to the present disclosure may include a drawer 150 for supplying detergent required, by the user, for a washing operation. The drawer 150 may be retractable into or extendable from the front panel 110. The user may extend the drawer 150 to supply the detergent and then retract the drawer 150 again. The above-described detergent may include various products necessary for treating the laundry, such as the detergent used during the washing or a fabric softener used during rinsing.

In addition, the cabinet 100 may include an inlet 111 through which the laundry is inserted or withdrawn. The inlet 111 may be defined to extend through the front panel 110. The inlet 111 may be defined to be in communication with the drum 300, so that the user may insert the laundry into the drum 300 or withdraw the laundry from the drum 300 via the inlet 111.

In addition, the cabinet 100 may include a door 140 that opens and closes the inlet 111. The door 140 may be pivotably coupled to the front panel 110 to open and close the inlet 111. The door 140 may be made of a transparent material, so that the user may check the inside of the drum 300 even when the door 140 closes the inlet 111.

A direction may be defined to help understand a detailed structure of the laundry treating apparatus to be described below. Based on a center of the cabinet 100, a direction toward the inlet 111 may be defined as a forward direction and an opposite direction thereof may be defined as a rearward direction. A right side and a left side may be naturally defined based on the setting of the forward and rearward directions.

Figure 2:
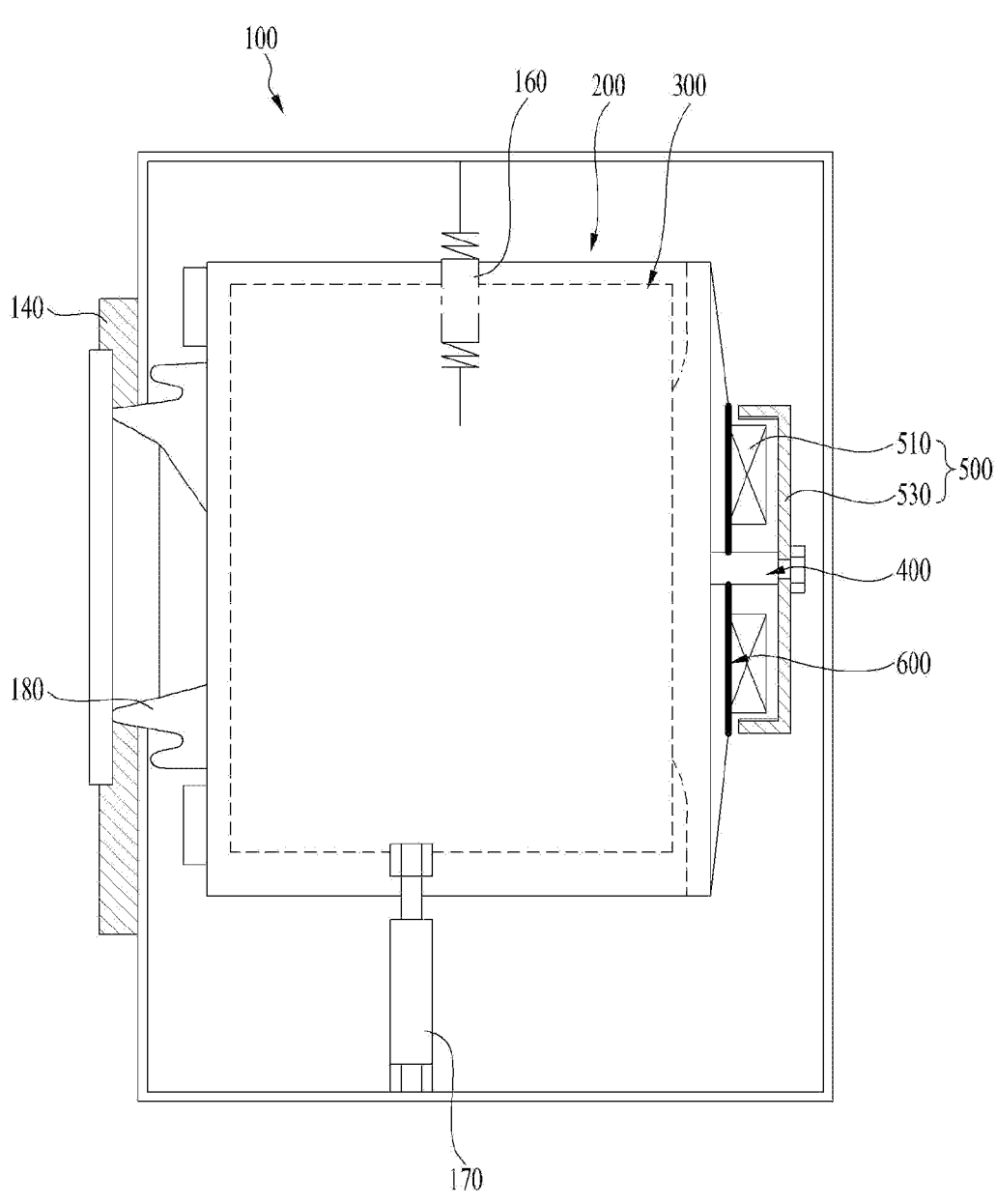
FIG. 2 briefly shows an inside of a laundry treating apparatus according to an embodiment of the present disclosure.

FIG. 2 briefly shows an inside of a laundry treating apparatus according to an embodiment of the present disclosure.

Referring to FIG. 2, the laundry treating apparatus according to one embodiment of the present disclosure includes a tub 200 disposed inside the cabinet 100 and storing water therein, and the drum 300 rotatably disposed inside the tub 200 and accommodating the laundry therein.

A driver 500 that rotates the drum 300 may be installed at the rear of the tub 200. The driver 500 may include a stator 510 that generates a rotating magnetic field and a rotor 530 that rotates by the rotating magnetic field generated by the stator 510.

In addition, the laundry treating apparatus according to one embodiment of the present disclosure may include a rotation shaft 400 connected to the rotor 530 and rotating together with the rotor 530 to rotate the drum 300. The rotation shaft 400 may extend through the tub 200 and be connected to the drum 300.

The laundry treating apparatus may include a spring 160 and a damper 170 for damping vibrations occurred by the operation of the driver 500 or vibrations occurred by an imbalance of the laundry accommodated inside the drum 300. The spring 160 and the damper 170 may be disposed to connect the outside of the tub 200 and the inside of the cabinet 100 to each other.

In addition, the laundry treating apparatus may include a gasket 180 that connects the tub 200 and the cabinet 100 to each other. The gasket 180 may connect the door 140 and the tub 200 to each other. The gasket 180 may prevent water from leaking via an opening defined in a front surface of the tub 200. In other words, the gasket 180 may shield a space between the door 140 and the tub 200 while the door 140 is closed to prevent water from leaking out of the tub 200.

In addition, the laundry treating apparatus may include a bearing housing 600 coupled to the tub 200 and rotatably supporting the rotation shaft 400. The bearing housing 600 may be installed on a rear surface of the tub 200. The bearing housing 600 may be inserted into the rear surface of the tub 200 and integrally formed with the tub 200.

The bearing housing 600 may be inserted into the tub 200 to allow the inside and the outside of the tub 200 to be in communication with each other. In addition, the bearing housing 600 may be fixed to the tub to firmly support the rotation shaft. That is, the bearing housing 600 may secure rigidity of the tub 200.

In addition, the bearing housing 600 may not only rotatably support the rotation shaft 400, but also provide a coupling surface to which the stator 510 is coupled. The stator 510 may be firmly supported by being coupled to the bearing housing 600.

The bearing housing 600 may be made of a metal material. Because the tub 200 is made of a synthetic resin such as plastic, there is a risk of being damaged by impacts applied by the drum 300 and the rotation shaft 400. However, the bearing housing 600 may be made of the metal material and absorb the impacts occurred by the drum 300 or the rotation shaft 400 to prevent the damage from occurring.

In addition, the tub 200 may be injection-molded with the bearing housing 600 inserted thereinto. Therefore, the tub 200 and the bearing housing 600 may be integrally formed. Because the tub 200 is the component that stores water therein, it is important to prevent the leakage of water. Therefore, when the bearing housing 600 is inserted into the tub 200 and manufactured integrally therewith, the leakage of water may be prevented from occurring at a joint between the tub 200 and the bearing housing 600.

Although not shown in the drawings, the laundry treating apparatus may further include a water supply (not shown) that supplies water necessary for the washing and a drainage (not shown) that discharges water accommodated in the tub after the washing is completed. The water supply may be connected to an external water supply source to receive water. In addition, the drainage includes a pump, and thus, will be able to forcibly drain water accommodated in the tub to the outside of the cabinet.

Figure 3:
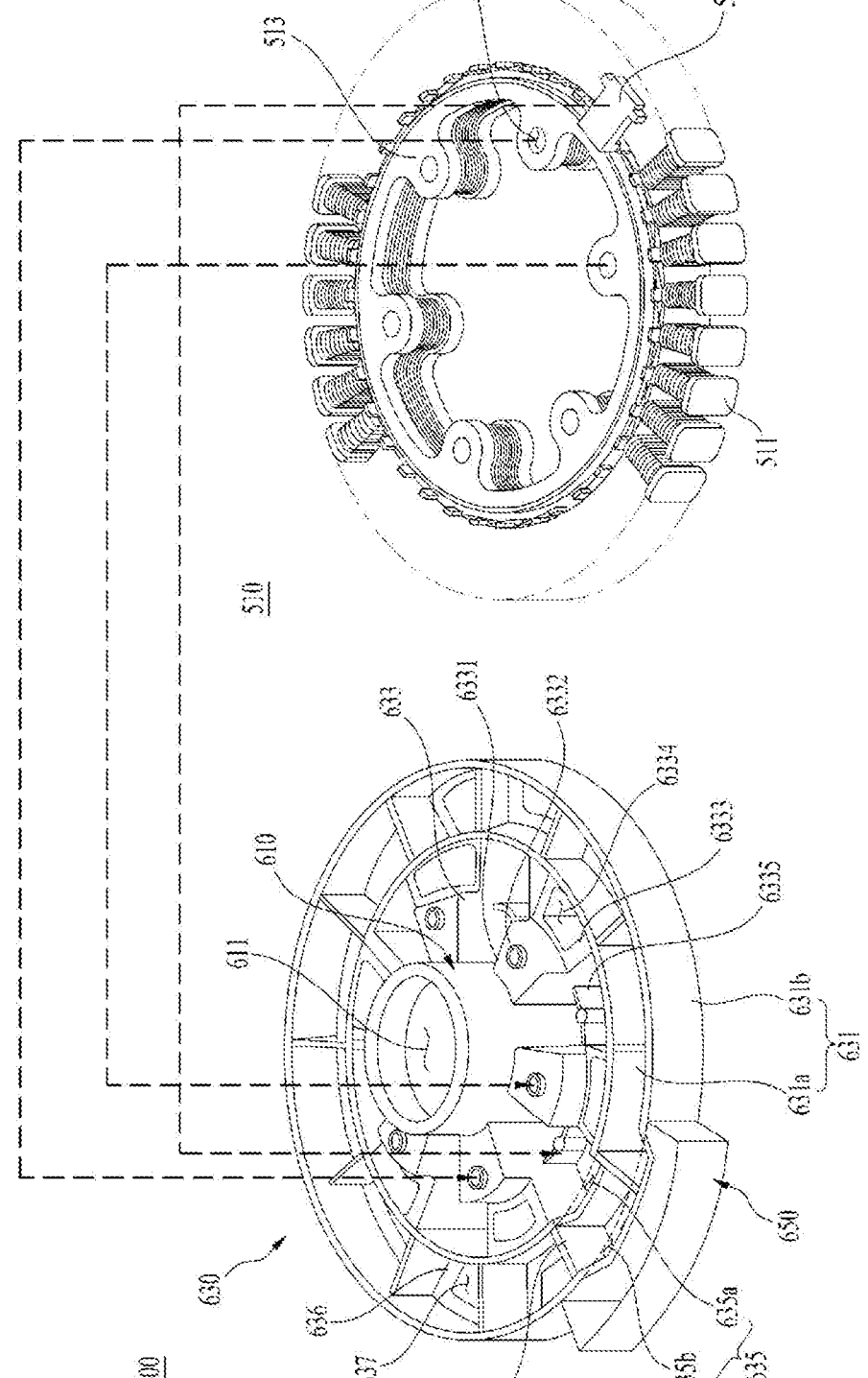
FIG. 3 shows a bearing housing and a stator of a laundry treating apparatus according to an embodiment of the present disclosure.

FIG. 3 shows a bearing housing and a stator according to an embodiment of the present disclosure.

A top surface of the bearing housing 600 shown in FIG. 3 may be disposed to face rearward while being coupled to the tub 200.

An arrow shown in FIG. 3 means that the bearing housing 600 and the stator 510 are coupled to each other along the arrow. That is, the stator 510 will be coupled to the bearing housing 600 after being rotated by 180 degrees relative to the left side from the illustrated state. In other words, when the coupling of the stator 510 and the bearing housing 600 is completed, the top surface of the bearing housing 600 and a top surface of the stator 510 are coupled to each other to face each other based on FIG. 3.

The stator 510 of the laundry treating apparatus according to one embodiment of the present disclosure may include an input terminal 515 that receives external power. The input terminal may be located on one surface of the stator 510 facing the bearing housing 600.

The stator 510 may include a main body 511 that generates the rotating magnetic field and a mounting body 513 for coupling the main body 511 to the bearing housing 600. The mounting body 513 may protrude inward in a radial direction from an inner circumferential surface of the main body 511. The mounting body 513 may include a mounting hole 514 defined therein. The mounting hole 514 may be coupled to the bearing housing 600. A coil that allows current to flow may be wound around the main body 511. When power is supplied from the outside, the current flows through the coil, and the rotating magnetic field may be generated on the coil.

The input terminal 515 may be connected to an external power source to supply the current to the coil. The input terminal 515 may be connected to the external power source by a wire. However, the rotor 530 may be disposed radially outwardly of the stator 510, and the wire may be disconnected or damaged by the rotation of the rotor 530. Therefore, it is preferable to dispose the wire farthest from the rotor 530 to prevent the wire from interfering with the rotor 530.

Therefore, it is preferable that the wire is located between the bearing housing 600 and the stator 510. Therefore, to position the wire between the bearing housing 600 and the stator 510, the input terminal 515 may be positioned on one surface of the main body 511 facing the bearing housing 600. The input terminal 515 may be disposed between the two adjacent mounting bodies 513.

In one example, the bearing housing 600 may include a hub 610 in which the rotation shaft is accommodated, an extension 630 that supports the hub 610 to the tub 200, and a reinforcing portion 650 that expands a diameter of the extension 630.

The hub 610 may be manufactured in a form of a hollow pipe. The hub 610 may include a shaft through-hole 611 through which the rotation shaft 400 extends. One or more bearings may be press-fitted into the shaft through-hole 611. The bearing press-fitted into the shaft through-hole 611 may rotatably support the rotation shaft 400.

In one example, the extension 630 may extend radially from an outer circumferential surface of the hub 610. The extension 630 may further improve a coupling force between the hub 610 and the tub 200. The extension 630 may be inserted into the tub 200 and fixed to the tub 200. The tub 200 may be injection-molded with the extension 630 inserted thereinto. Accordingly, a shape of the tub 200 may be similar to a shape of the extension. That is, when the extension 630 is inserted into the rear surface of the tub 200, the rear surface of the tub 200 may be shaped to exhibit a curve of the extension 630.

The extension 630 may further include a circumferential rib 631 that improves rigidity of the bearing housing 600 while increasing a coupling force between the bearing housing 600 and the tub 200. The circumferential rib 631 may be spaced apart from the hub 610 to surround the hub 610. The circumferential rib 631 may be formed in a ring shape to surround the hub 610.

In addition, the extension 630 may include a fastening portion 633 connecting the circumferential rib 631 and the hub 610 to each other and to which the stator 510 is coupled. The mounting body 513 of the stator 510 may be coupled to the fastening portion 633.

The fastening portion 633 may include a fastening body 6331 that provides the coupling surface to which the stator 510 is coupled, and a connecting body 6333 that connects the fastening body and the circumferential rib 631 to each other. The fastening body 6331 and the connecting body 6333 may be stepped to each other. When the fastening portion 633 is inserted into the tub 200, the fastening body 6331 may be exposed from the rear surface of the tub, and the connecting body 6333 may be inserted into and fixed to the tub 200.

The fastening portion 633 may include a fastening protrusion 6332 that protrudes from the fastening body 6331 toward the stator 510. The fastening protrusion 6332 may be formed in a shape corresponding to the mounting hole 514 of the stator 510. The fastening protrusion 6332 may include a hole defined therein into which a fastening member may be inserted. However, the present disclosure may not be limited thereto, and the fastening protrusion 6332 may be formed in a protruding shape so that the mounting hole 514 is fastened thereto without inserting the fastening member.

In addition, the fastening portion 633 may include a connecting hole 6334 defined therein to extend through the connecting body 6333. In the process in which the tub 200 is injection-molded, molten resin may flow into the connecting hole 6334. Accordingly, a portion of a rear wall of the injection-molded tub 200 may be positioned in the connecting hole 6334. That is, a coupling strength between the tub 200 and the bearing housing 600 may be improved via the connecting hole 6334.

An opposite side of the fastening portion 633, which is not shown in the drawing, may be molded in a form of accommodating the molten resin forming the tub therein. That is, the opposite side of the fastening portion 633 to which the stator 510 is coupled may be defined as an empty space. In other words, the fastening portion 633 may be molded into a bent metal plate.

An inner side of the rear wall of the tub 200 may be molded to correspond to a shape of the fastening portion 633. That is, an inner surface of the rear wall of the tub 200 may be molded along the bent shapes of the fastening portion 633 and the circumferential rib 631 to define a space therein. Water used for the washing may remain in the corresponding space. A structure for removing residual water will be described later.

In addition, the fastening portion 633 may include a plurality of fastening portions. The fastening portions 633 may be spaced apart from each other along a circumference of the hub 610. In the drawing, it is shown that the fastening portions 633 are spaced apart from each other by 60 degrees. However, the present disclosure may not be limited thereto, and the fastening portions 633 may be arranged in various schemes for securing the rigidity of the bearing housing 600.

The extension 630 may include each coupling rib 6335 that connects the two adjacent fastening portions 633. The coupling ribs 6335 may be disposed to support the plurality of fastening portions 633 to each other, so that rigidity of the fastening portion 633 may be secured. The coupling rib 6335 may be molded to have a curved shape to more effectively support the fastening portion 633. However, the present disclosure may not be limited thereto and the coupling rib 6335 may be formed in a flat shape.

In one example, the extension 630 may include an avoidance portion 635 that is bent from a free end of a portion of the circumferential rib 631 facing the input terminal 515 to avoid interference with the input terminal 515.

The input terminal 515 may protrude from the main body 511 of the stator 510 toward the bearing housing 600 by a predetermined length. Therefore, the extension 630 needs to secure a space in which the input terminal 515 is disposed. Therefore, the space in which the input terminal 515 is disposed may be defined by removing or bending a portion of the extension 630.

The avoidance portion 635 may be formed by being bent from the free end of the circumferential rib 631 to define the space in which the input terminal 515 is disposed. The avoidance portion 635 may define the space in which the input terminal 515 is disposed therein, but rigidity of the extension 630 may be reduced as the avoidance portion 635 is formed. Therefore, it is necessary to compensate for the reduction in the rigidity of the extension 630 by the avoidance portion 635.

The reinforcing portion 650 may compensate for the reduction in the rigidity of the extension 630 caused by the avoidance portion 635. The reinforcing portion 650 may be formed locally in a portion where the avoidance portion 635 is disposed. That is, the reinforcing portion 650 may be disposed to be spaced apart from the avoidance portion 635 in the radial direction.

In other words, to define the mounting space of the input terminal 515, the avoidance portion 635 may be disposed at a portion of the circumferential rib 631, and the reinforcing portion 650 may be disposed at a portion where the avoidance portion 635 is disposed to locally reinforce the rigidity of the extension 630.

The reinforcing portion 650 may be disposed parallel to the input terminal 515 in the radial direction. In addition, the reinforcing portion 650 may be disposed parallel to the avoidance portion in the radial direction. That is, the reinforcing portion 650 may increase the rigidity of the extension 630 reduced by the avoidance portion by locally expanding the diameter of the extension 630.

When the reinforcing portion 650 locally expands the diameter of the extension 630, a weak section of the extension 630 may be intensively reinforced to prevent unnecessary consumption of materials while securing the rigidity of the bearing housing 600, and a weight of the entire bearing housing 600 may be reduced.

In one example, because the mounting body 513 of the stator 510 may be coupled to the fastening portion 633 and the input terminal 515 may be positioned between the two adjacent mounting bodies 513, the avoidance portion 635 that defines the space where the input terminal 515 is located may be located between the two adjacent fastening portions 633.

Because an empty space may be defined between the two adjacent fastening portions 633, it is easy to dispose the input terminal 515. Therefore, when the avoidance portion 635 is positioned between the two adjacent fastening portions 633, a volume of the circumferential rib 631 that needs to be bent to form the avoidance portion 635 may be reduced. Accordingly, there is an effect of minimizing a degree of the reduction in the rigidity of the extension 630 by the avoidance portion 635.

In one example, the circumferential rib 631 may include a plurality of circumferential ribs. In addition, the circumferential ribs 631 may be spaced apart from each other in the radial direction. As the number of circumferential ribs 631 increases, the rigidity of the extension 630 may increase. However, when the number of circumferential ribs 631 is excessively increased, the materials may be unnecessary consumed and the weight may increase. Therefore, the number of circumferential ribs 631 may be variously determined based on a use environment of the laundry treating apparatus. A following description will be made based on the fact that the number of circumferential ribs 631 is two. However, the present disclosure may not be limited thereto and may include various embodiments.

When the circumferential rib 631 includes the plurality of circumferential ribs, the avoidance portion 635 may also include a plurality of avoidance portions. The plurality of avoidance portions 635 may be disposed on the plurality of circumferential ribs, respectively. Because the avoidance portion 635 corresponds to a component that prevents the interference with the input terminal 515, when there is a circumferential rib that does not interfere with the input terminal 515 among the plurality of circumferential ribs 631, the corresponding circumferential rib 631 may not have the avoidance portion 635.

In addition, the reinforcing portion 650 may extend in the radial direction from an outer circumferential surface of a circumferential rib 631 disposed at an outermost side among the plurality of circumferential ribs 631. The reinforcing portion 650 may perform the function of locally expanding the diameter of the extension 630. Accordingly, the reinforcing portion 650 may extend from the outermost circumferential rib 631 to locally expand the diameter of the extension.

The circumferential rib 631 may include a first circumferential rib 631a connected to the fastening portion 633 and a second circumferential rib 631b disposed to be radially outwardly spaced apart from the first circumferential rib 631a. In addition, the reinforcing portion 650 may extend from an outer circumferential surface of the second circumferential rib 631b.

When the number of circumferential ribs 631 is two, the reinforcing portion 650 will extend from the outer circumferential surface of the outermost second circumferential rib 631b. In addition, even when the number of circumferential ribs 631 is three, when the second circumferential rib 631b is located at the outermost side, the reinforcing portion 650 may extend from the outer circumferential surface of the second circumferential rib 631b.

The extension may include at least one support rib 632 that connects the first circumferential rib 631a and the second circumferential rib 631b to each other. The first circumferential rib 631a may be connected to the fastening portion 633 to support the hub 610. However, the second circumferential rib 631b may not be connected to the hub 610. Accordingly, the support rib 632 may support the second circumferential rib 631b by connecting the second circumferential rib 631b and the first circumferential rib 631a to each other.

The support rib 632 may extend in the radial direction of the extension 630. The extension 630 may more firmly support the rotation shaft by the circumferential rib 631 and the support rib 632, and thus, the rigidity of the bearing housing 600 may be further improved.

In addition, the molten resin forming the tub may be introduced between the support rib 632, the first circumferential rib 631a, and the second circumferential rib 631b. In the process of injecting the tub 200 with the bearing housing 600 inserted thereinto, the molten resin may surround surfaces of the support rib 632, the first circumferential rib

631a, and the second circumferential rib 631b. Therefore, when the molding of the tub 200 is completed, the support rib 632, the first circumferential rib 631a, and the second circumferential rib 631b may be inserted inside the tub and prevented from being exposed to the outside.

The support rib 632, the first circumferential rib 631a, and the second circumferential rib 631b may be inserted into the rear wall of the tub 200 and integrally formed with the tub 200. In addition, the support rib 632, the first circumferential rib 631a, and the second circumferential rib 631b may support the tub in a circumferential direction and the radial direction, so that rigidity of the rear wall of the tub 200 may be improved.

In one example, the extension 630 may further include a flange 636 that connects the free end of the circumferential rib 631 and a free end of the support rib 632 disposed to face forward to each other. The flange may connect the circumferential rib 631 and the support rib 632 to each other to increase a coupling force between the circumferential rib 631 and the support rib 632.

In addition, the extension 630 may further include a flange hole 637 defined to extend through the flange 636. The molten resin used to manufacture the tub in the tub molding process may pass through the flange hole 637. A portion of the completed tub 200 may be positioned inside the flange hole 637. The flange hole 637 may increase a coupling force between the tub 200 and the extension 630.

Figure 4:
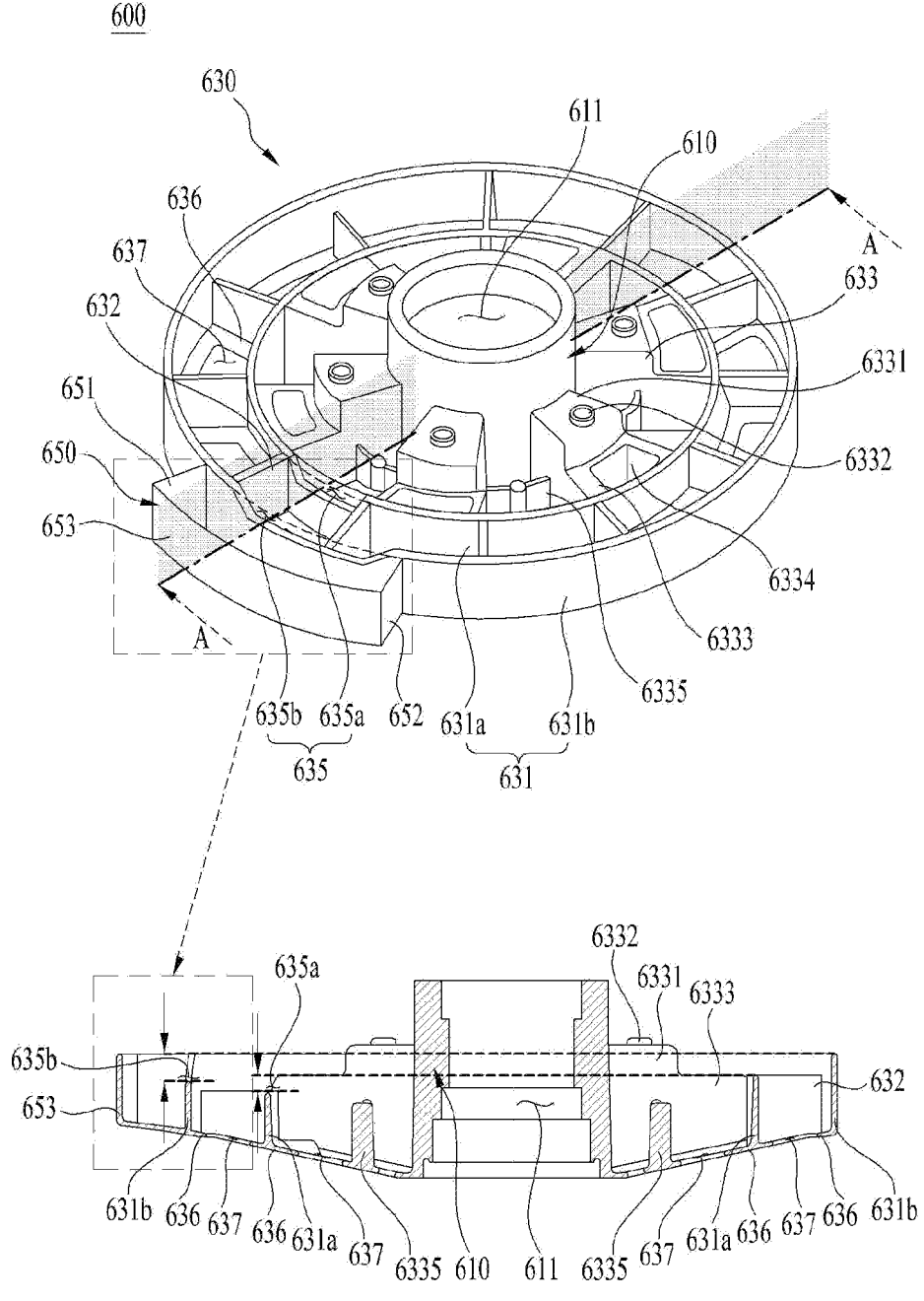
FIG. 4 shows a bearing housing of a laundry treating apparatus according to an embodiment of the present disclosure and a cross-section of the bearing housing.

FIG. 4 shows a bearing housing of a laundry treating apparatus according to an embodiment of the present disclosure and a cross-section of the bearing housing. The cross-section shown is a cross-section across the avoidance portion 635. The cross-section shown is a cross-section obtained by cutting the avoidance portion 635 in a plane including a center of rotation of the rotation shaft.

Referring to FIG. 4, the coupling rib 6335, the first circumferential rib 631a, and the second circumferential rib 631b may be spaced apart from each other in the radial direction. The coupling rib 6335 may be disposed to connect the fastening portions 633 to each other in the circumferential direction. In addition, the second circumferential rib 631b may be spaced apart from the fastening portion 633 in the radial direction. In addition, the first circumferential rib 631a may be disposed between the second circumferential rib 631b and the coupling rib 6335. The first circumferential rib 631a may be connected to a radially outer side of the fastening portion 633. A radially inner side of the fastening portion 633 may be connected to the hub 610.

In one example, the reinforcing portion 650 may include a first extending rib 651 that extends in the radial direction from an outer circumferential surface of the circumferential rib 631, a second extending rib 652 that is spaced apart from the first extending rib 651 along a circumference of the circumferential rib 631 and extends in the radial direction from the outer circumferential surface of the circumferential rib 631, and a reinforcing rib 653 that connects the first extending rib 651 and the second extending rib 652 to each other.

The first extending rib 651 and the second extending rib 652 may extend in the radial direction around the hub 610. In addition, the reinforcing rib 653 may be disposed in parallel with the circumferential rib 631. That is, the reinforcing rib 653 may be formed in a shape of a concentric arc having a greater diameter than the circumferential rib 631. When the reinforcing rib 653 is disposed in parallel with the circumferential rib 631, the reinforcing portion 650 may more effectively improve the rigidity of the extension 630.

The reinforcing portion 650 may be composed of the first extending rib 651, the second extending rib 652, and the reinforcing rib 653 to have an empty space defined therein. Therefore, the reinforcing portion 650 may secure the rigidity of the extension 630 by expanding the diameter of the extension 630, but may prevent the excessive increase in the weight or the unnecessary consumption of the materials.

In addition, at least one of the first extending rib 651 and the second extending rib 652 may be disposed parallel to the support rib 632. The first extending rib 651 and the second extending rib 652 may extend in the radial direction around the hub 610. Like the first extending rib 651 and the second extending rib 652, the support rib 632 may extend in the radial direction around the hub 610. Therefore, when the first extending rib 651 or the second extending rib 652 and the support rib 632 are arranged in parallel with each other, a supporting force of supporting the extension 630 may be improved. Therefore, the rigidity of the bearing housing 600 may be further secured.

The first extending rib 651 or the second extending rib 652 being disposed parallel to the support rib 632 may mean that the first extending rib 651 or the second extending rib 652 is disposed on a radially extending line of the support rib 632. The support rib 632 may include a plurality of support ribs. Accordingly, the first extending rib 651 and the second extending rib 652 may be disposed in parallel with different support ribs 632.

When the first extending rib 651 or the second extending rib 652 is disposed in parallel with the support rib 632, the first extending rib 651 or the second extending rib 652 may be formed integrally with the support rib 632, and the integrally formed rib and the circumferential rib 631 may intersect each other. Accordingly, rigidity of the reinforcing portion 650 may be improved.

In the cross-section shown in FIG. 4, the extension 630 may include the avoidance portion 635 that prevents the interference with the input terminal 515. The avoidance portion 635 may be formed in a shape in which the free end of the circumferential rib 631 is bent. When compared with a free end of a circumferential rib 631 located on an opposite side, the avoidance portion 635 may be formed such that a portion of a free end is removed.

The first avoidance portion 635a may be located at the first circumferential rib 631a. In addition, the second avoidance portion 635b may be located at the second circumferential rib 631b. In the first avoidance portion 635a, when compared to a free end of a portion the first circumferential rib 631a located on the opposite side, a free end of the portion of the first circumferential rib 631a facing the input terminal 515 may be bent. Therefore, a vertical level difference between the free end of the portion of the first circumferential rib 631a facing the input terminal 515 and the free end of the portion of the first circumferential rib 631a located on the opposite side may occur by the first avoidance portion 635a. The input terminal 515 may be located on the first avoidance portion 635a.

The second avoidance portion 635b may also be formed similarly to the first avoidance portion 635a. Therefore, a vertical level difference between a free end of a portion of the second circumferential rib 631b facing the input terminal 515 and a free end of a portion of the second circumferential rib 631b disposed on an opposite side may occur by the second avoidance portion 635b.

Except for the portion where the avoidance portion 635 is disposed, a height of the circumferential rib 631 may be constant along the circumference.

As described above, the avoidance portion 635 may be formed locally only in the portion facing the input terminal 515. Therefore, an additional space may be prevented from being consumed to dispose the input terminal 515. Therefore, a coupling structure of the stator 510 and the bearing housing 600 may be simplified, and efficiency of space utilization may be improved.

In addition, the reinforcing portion 650 may be disposed parallel to the avoidance portion 635 in the radial direction. That is, the reinforcing portion 650 may be disposed on an extension line passing through the hub 610 and the avoidance portion 635. In other words, the reinforcing portion 650 may intensively reinforce a portion where the rigidity of the extension 630 is reduced by the avoidance portion 635. Therefore, the reinforcing portion 650 may prevent the unnecessary consumption of the materials and prevent the excessive increase in the weight of the bearing housing 600.

The reinforcing portion 650 may intensively reinforce the rigidity of the weak portion where the avoidance portion 635 is disposed rather than reinforcing rigidity of an entirety of the extension 630.

In one example, the flange 636 may be disposed at an end of the circumferential rib 631 on a side away from the stator 510. That is, the flange 636 may be disposed in front of the circumferential rib 631 based on the state in which bearing housing 600 is coupled. The flange 636 may increase a front area size of the circumferential rib 631. In addition, the flange 636 may support the circumferential rib 631 to improve rigidity of the circumferential rib 631.

The flange 636 may increase a cross-sectional area moment by increasing an area size of an end of the circumferential rib 631. Therefore, there is an effect of increasing the rigidity of the circumferential rib 631. In addition, the extension 630 may include the flange hole 637 defined between flanges spaced apart from each other. In the process of molding the tub 200, the molten resin may flow into the flange hole 637, and a portion of the tub 200 that has been molded may be positioned in the flange hole 637. That is, the flange hole 637 may allow the tub 200 and the bearing housing 600 to come into contact with each other at more points, thereby improving the coupling force between the tub 200 and the bearing housing 600.

In addition, the flange hole 637 may reduce an extension length of the flange 636 in the radial direction. When a size of the flange hole 637 is increased, an area size of the flange 636 may be reduced. When the tub is cooled after being exposed to a high temperature during the washing process, cracks may occur in the tub 200 because of a difference in cooling speed between the tub 200 and the bearing housing 600. Therefore, by reducing the extension length of the flange 636 in the radial direction, the cracks may be prevented from occurring because of the difference in cooling speed.

The extension length of the flange 636 in the radial direction may be designed to be a length that may sufficiently secure the rigidity of the entirety of the bearing housing 600, but may prevent the cracks. The length of the flange 636 may be determined in consideration of various factors such as a size of the tub 200, a material of the tub 200, a design load, and the like.

Figure 5:
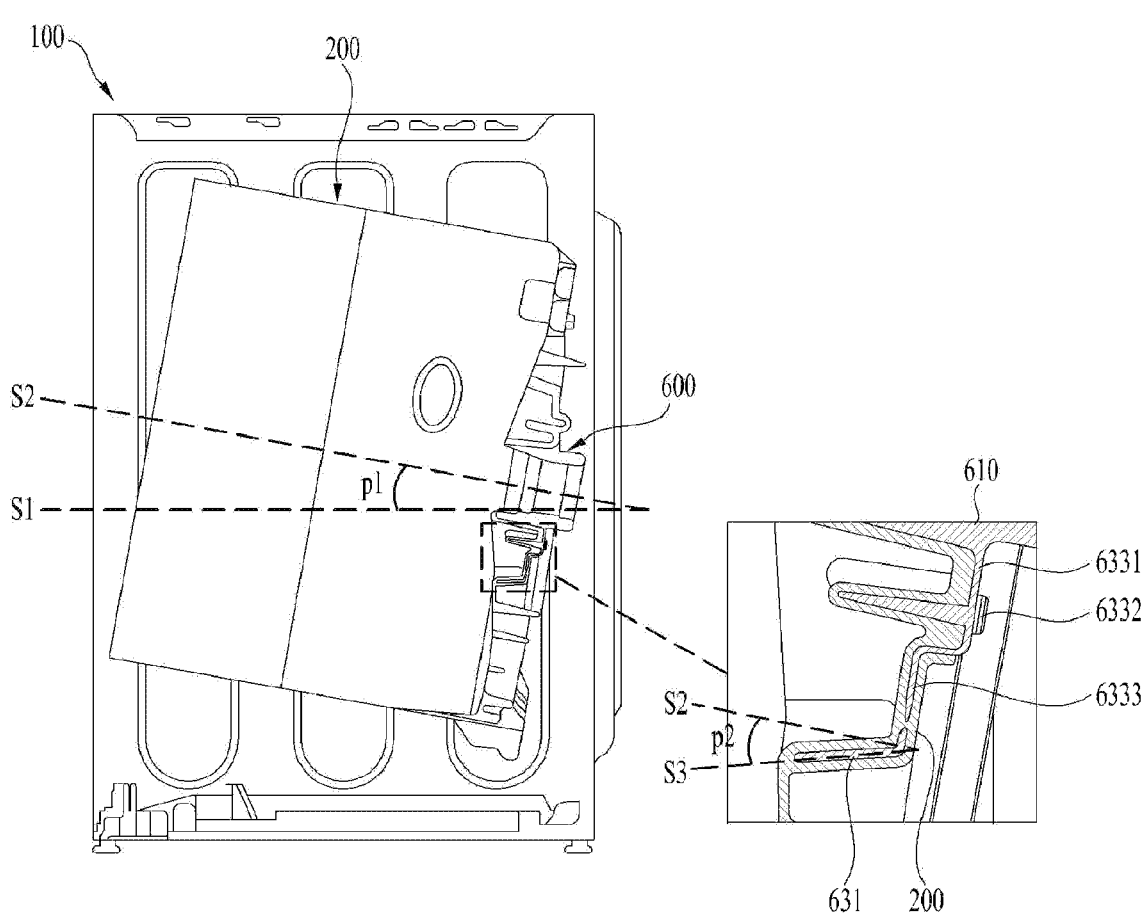
FIG. 5 shows a cross-section of a tub according to an embodiment of the present disclosure.

FIG. 5 shows a cross-section of a tub into which a bearing housing is inserted.

Referring to FIG. 5, the bearing housing 600 is inserted into the rear wall of the tub 200. The tub 200 may be injection-molded with the bearing housing 600 inserted thereinto. Therefore, the tub 200 and the bearing housing 600 may be integrally formed with each other.

As shown in the drawing, the tub 200 may be disposed inside the cabinet 100 and be upwardly inclined forwards. When the tub 200 is inclined, the bearing housing injected into the rear surface of the tub 200 may also be inclined together with the tub 200. In addition, the rotation shaft extending through the bearing housing 600 may be inclined. In addition, the drum connected to the rotation shaft 400 may be inclined.

When other components in addition to the tub 200 are upwardly inclined forwards, user's convenience increases because the user may have to bend down less when withdrawing the laundry accommodated inside the drum. In addition, when the drum is inclined, a falling degree of the laundry accommodated therein increases when the drum rotates, so that a washing effect may be improved.

On the other hand, when the tub 200 is inclined, water may accumulate inside the rear wall of the tub 200 formed by the bearing housing 600. As shown in the drawing, an opposite side of the fastening portion 633 to which the stator 510 is coupled is molded into a concave shape in which water is able to be accommodated by the circumferential rib 631 and the connecting body 6333.

The rear wall of the tub 200 may be injection-molded with the bearing housing 600 inserted thereinto. Therefore, the rear wall of the tub 200 may be molded based on the shape of the bearing housing 600. Therefore, the rear wall of the tub may be molded to have an accommodating space having a shape corresponding to that formed by the circumferential rib 631 and the connecting body 6333. That is, a shape of the bearing housing 600 to be described later may be understood as the same as the shape of the rear wall of the tub 200.

An inner circumferential surface of the circumferential rib 631 may form an accommodating portion together with the fastening portion 633. Accordingly, water used for the washing may remain in the accommodating portion. However, when water remains in the corresponding accommodating space, a bad odor may occur or bacteria may propagate, causing hygiene problems. Accordingly, when an angle of the circumferential rib 631 is adjusted to prevent water remaining inside, the above-mentioned problem may be prevented from occurring.

To solve such problem, the circumferential rib 631 may be formed such that a distance away from the hub 610 increases as a distance from the stator 510 increases. That is, the circumferential rib 631 may not be disposed parallel to the hub 610, but may have a predetermined inclination relative to the hub 610.

Water located on the inner circumferential surface of the circumferential rib 631 by the inclination may fall to a circumference of the tub 200 by a weight thereof, and the water may be discharged to the outside using a drainage device.

In addition, the circumferential rib 631 may be downwardly inclined forwards with respect to the ground. The ground may mean an installation surface on which the laundry treating apparatus is installed. When the circumferential rib 631 is downwardly inclined forwards with respect to the ground, water located on the inner circumferential surface of the circumferential rib 631 may fall to an inner circumferential surface of the tub 200 because of the weight thereof. Therefore, the problem that occurs as water remains on the rear wall of the tub 200 may be prevented.

In other words, a line extending in a front and rear direction of the laundry treating apparatus and parallel to the ground may be defined as a first extension line S1, and a line parallel to the center of rotation of the rotation shaft 400 may be defined as a second extension line S2. In addition, a line parallel to a height direction of the circumferential rib 631 may be defined as a third extension line S3. That is, a line that connects both ends of the circumferential rib 631 to each other with the shortest distance may be defined as the third extension line S3.

When the tub 200 is disposed parallel to the ground, the first extension line S1 and the second extension line S2 may also be disposed parallel to each other. On the other hand, when the tub 200 is disposed to be upwardly inclined forwards, the first extension line S1 and the second extension line S2 may have a predetermined angle. The angle between the first extension line S1 and the second extension line S2 may be defined as a first inclination angle p1.

In addition, when the hub 610 and the circumferential rib 631 are arranged in parallel with each other, the second extension line S2 and the third extension line S3 may also be arranged in parallel with each other. However, when the circumferential rib 631 is inclined with respect to the hub 610, the second extension line S2 and the third extension line S3 may have a predetermined angle, and the corresponding angle may be defined as a second inclination angle p2.

In other words, the first inclination angle p1 may mean an angle between the center of rotation of the rotation shaft and the ground, and the first inclination angle p1 may mean an angle at which the tub 200 is inclined with respect to the ground. In addition, the first inclination angle p1 may mean an angle at which the bearing housing 600 fixed to the rear wall of the tub 200 is inclined with respect to the ground.

In addition, the second inclination angle p2 may mean an angle between the center of rotation of the rotation shaft 400 and the circumferential rib 631. In addition, because the center of rotation of the rotation shaft 400 may be disposed in parallel with the hub 610, the second inclination angle p2 may mean an angle between the hub 610 and the circumferential rib 631.

Based on the above description, when the second inclination angle p2 is smaller than the first inclination angle p1, the circumferential rib 631 may be downwardly inclined forwards. Therefore, water located on the circumferential rib 631 may flow to the inner circumferential surface of the tub 200 by the weight thereof.

In addition, when the second inclination angle p2 is greater than the first inclination angle p1, water located on the circumferential rib 631 may flow to the inner circumferential surface of the tub 200 by the weight thereof in the same manner as described above.

Therefore, water may be prevented from remaining on the rear wall of the tub by adjusting the magnitude relationship between the first inclination angle p1 and the second inclination angle p2, and the bad odor or the like caused by the remaining water may be prevented from occurring.

A description will be made with specific numerical values. When the tub 200 is inclined at 10 degrees with respect to the ground, the bearing housing 600 inserted into the rear wall of the tub 200 may also be inclined at 10 degrees with respect to the ground. That is, the first inclination angle p1 may be 10 degrees. In this regard, when the angle between the center of rotation of the rotation shaft 400 and the circumferential rib 631, that is, the second inclination angle p2 is smaller than 10 degrees, the circumferential rib 631 will be upwardly inclined with respect to the ground. Therefore, water located on the circumferential rib 631 may not be able to flow toward the outer circumferential surface of the tub 200 and may remain on the rear wall of the tub 200.

On the other hand, when the second inclination angle p2 is greater than the first inclination angle p1 of 10 degrees, the circumferential rib 631 may be downwardly inclined forwards. Therefore, water located on the inner circumferential surface of the circumferential rib 631 will flow to the inner circumferential surface of the tub 200 by the weight thereof and will be discharged to the outside via the drainage device. Therefore, there is the effect of preventing the problem caused by water remaining on the rear wall of the tub 200.

The above-described specific numerical values are only mentioned for easy understanding, and the present disclosure is not limited thereto. Accordingly, the first inclination angle p1 and the second inclination angle p2 may be set in consideration of various conditions such as the inclination of the installation surface and a size of the tub.

Figure 6:
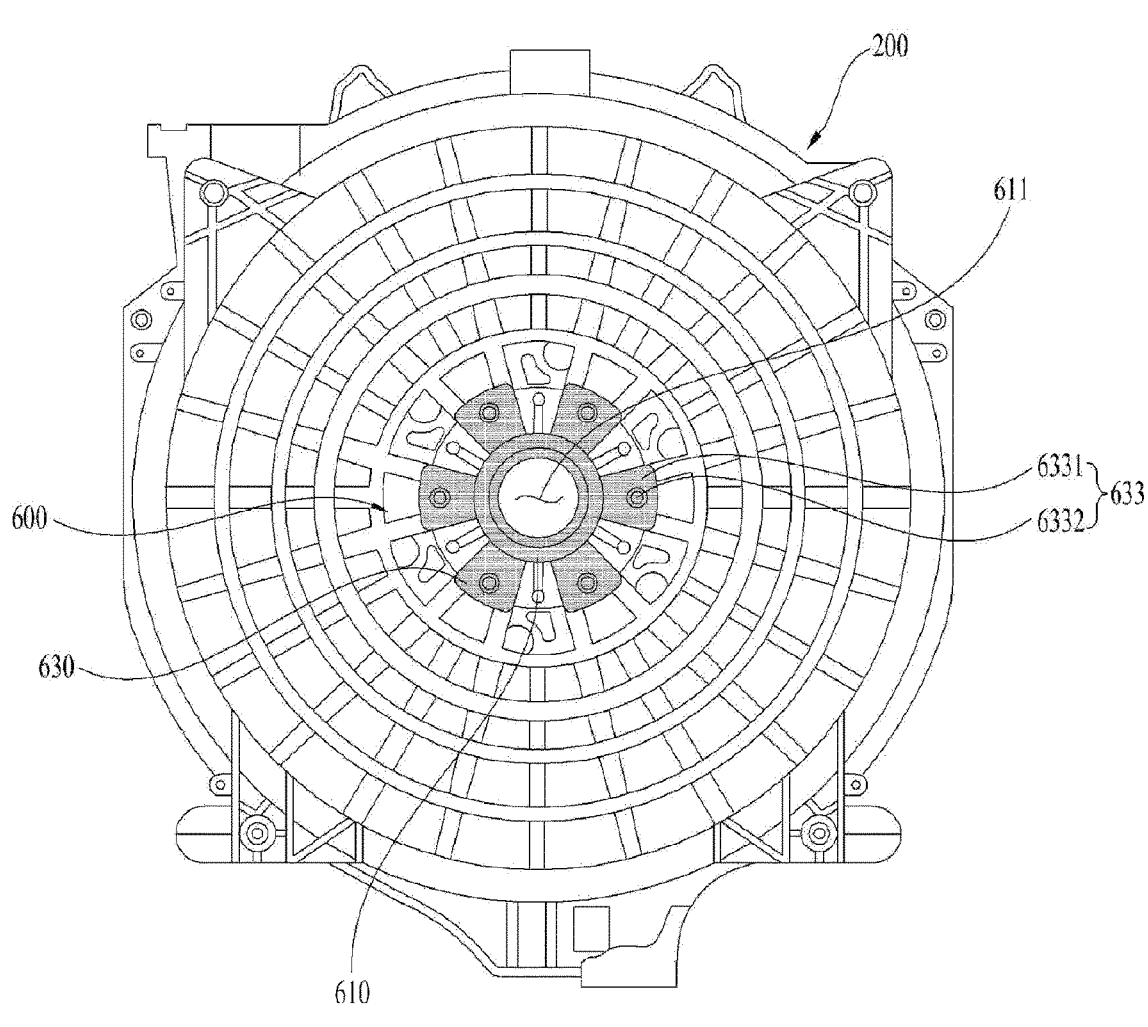
FIG. 6 is a rear view of a tub according to an embodiment of the present disclosure.

FIG. 6 is a rear view of a tub into which a bearing housing is inserted.

Referring to FIG. 6, the bearing housing 600 may be inserted into the tub 200, but the portion thereof may be exposed from the rear surface of the tub 200. As described above, the tub 200 may be injection-molded with the bearing housing 600 inserted thereinto. In this regard, the molten resin forming the tub 200 may surround the entire bearing housing 600 except for the shaft through-hole 611 of the bearing housing 600 into which the rotation shaft 400 is inserted. However, as shown in the drawing, a portion of the extension 630 of the bearing housing 600 may be exposed rearwardly of the tub.

Particularly, a portion of the fastening portion 633 may be exposed rearwardly of the tub. When the molten resin surrounds an entirety of a rear surface of the fastening portion 633, a possibility that a tolerance occurs in the fastening portion 633 increases. Therefore, when the fastening portion 633 is coupled to the stator 510, an additional process such as partially processing the tub 200 located at the rear of the fastening portion may be required.

However, when the portion of the fastening portion 633 is exposed rearwardly of the tub 200, the stator 510 may be directly coupled to the fastening portion 633, which shortens the process and facilitates assembly.

The fastening portion 633 may include the fastening body 6331 to which the stator is coupled and the connecting body 6333 that connects the fastening body 6331 and the circumferential rib 631 to each other. The stator 510 may be coupled to the fastening body 6331 and spaced apart from the connecting body 6333. Accordingly, the connecting body 6333 may be inserted into the tub 200 and the fastening body 6331 may be exposed.

The fastening portion 633 may include the fastening protrusion 6332 protruding from the fastening body 6331 toward the stator 510. The fastening protrusion 6332 may also be disposed to be exposed rearwardly of the tub 200 together with the fastening body 6331. Therefore, the stator 510 may be directly connected to and firmly coupled to fastening protrusion 6332.

When the fastening protrusion 6332 and the fastening body 6331 are exposed without being inserted into the rear wall of the tub 200, there is no need to consider a thickness of the tub 200 and the stator 510 is able to be coupled without the post-processing process, so that the process may be simplified and a manufacturing cost may be reduced.

Although the present disclosure has been shown and described in relation to a specific embodiment, it will be apparent to those of ordinary skill in the art that the present disclosure may be improved and changed in various ways without departing from the technical spirit of the present disclosure provided by the claims below.

The invention claimed is:

1. A laundry treating apparatus comprising:
a cabinet;
a tub disposed inside the cabinet and configured to receive water;
a drum rotatably disposed inside the tub and configured to accommodate laundry;
a driver comprising (i) a stator disposed at a rear side of the tub and configured to generate a rotating magnetic field and (ii) a rotor configured to be rotated by the rotating magnetic field;
a rotation shaft connected to the rotor and configured to be rotated by the rotor, the rotation shaft extending through the tub and being connected to the drum; and
a bearing housing that is fixed to the tub and rotatably supports the rotation shaft,
wherein the stator is coupled to the bearing housing, the stator comprising an input terminal disposed at a surface of the stator facing the bearing housing and configured to receive external power,
wherein the bearing housing comprises:
a hub that accommodates the rotation shaft,
an extension that extends in a radial direction from an outer circumferential surface of the hub and connects the hub to the tub, and
a reinforcing portion that is parallel to the input terminal and extends radially outward from an outer circumferential surface of the extension,
wherein the extension comprises:
a plurality of circumferential ribs that are spaced apart one another in the radial direction and surround the hub,
a fastening portion that connects the hub to the plurality of circumferential ribs, the fastening portion being coupled to the stator, and
an avoidance portion that is bent from a portion of a free end of each of the plurality of circumferential ribs, the avoidance portion facing the input terminal without interference with the input terminal, and
wherein the reinforcing portion extends outward in the radial direction from an outer circumferential surface of a circumferential rib disposed at an outermost side among the plurality of circumferential ribs, the reinforcing portion being spaced apart from the avoidance portion in the radial direction to thereby define a local diameter of the extension that is greater than a diameter of the circumferential rib disposed at the outermost side among the plurality of circumferential ribs.

2. The laundry treating apparatus of claim 1, wherein the fastening portion is one of a plurality of fastening portions that are spaced apart from one another along a circumference of the hub, and
wherein the avoidance portion is located between two adjacent fastening portions among the plurality of fastening portions.

3. The laundry treating apparatus of claim 1,
wherein the avoidance portion is one of a plurality of avoidance portions that are disposed at the plurality of circumferential ribs, respectively.

4. The laundry treating apparatus of claim 1, wherein the plurality of circumferential ribs comprise:
a first circumferential rib connected to the fastening portion; and
a second circumferential rib spaced apart from the first circumferential rib outward in the radial direction, and wherein the reinforcing portion extends from an outer circumferential surface of the second circumferential rib.

5. The laundry treating apparatus of claim 4, wherein the extension comprises a support rib that connects the first circumferential rib and the second circumferential rib to each other.

6. The laundry treating apparatus of claim 5, wherein the reinforcing portion comprises:

a first extending rib that extends in the radial direction from the outer circumferential surface of the second circumferential rib;

a second extending rib spaced apart from the first extending rib along a circumference of the second circumferential rib, the second extending rib extending in the radial direction from the outer circumferential surface of the second circumferential rib; and a reinforcing rib that connects the first extending rib and the second extending rib to each other.

7. The laundry treating apparatus of claim 6, wherein at least one of the first extending rib or the second extending rib extends parallel to the support rib.

8. The laundry treating apparatus of claim 1, wherein a distance between the circumferential rib and the hub increases as the circumferential rib extends away from the stator.

9. The laundry treating apparatus of claim 8, wherein the circumferential rib extends forward and is inclined downward toward a ground surface that supports the cabinet.

10. The laundry treating apparatus of claim 1, wherein the tub extends forward and is upwardly inclined, and wherein the bearing housing is upwardly inclined and fixed to a rear surface of the tub.

11. The laundry treating apparatus of claim 10, wherein the bearing housing defines a first inclination angle with respect to a ground surface that supports the cabinet, wherein the circumferential rib is inclined with respect to a center axis of the rotation shaft by a second inclination angle, and wherein the second inclination angle is greater than the first inclination angle.

12. The laundry treating apparatus of claim 1, wherein the bearing housing is inserted into the tub, and a portion of the fastening portion is exposed from a rear surface of the tub.

13. The laundry treating apparatus of claim 1, wherein the reinforcing portion protrudes from the outer circumferential surface of the circumferential rib in a direction away from the hub.

14. The laundry treating apparatus of claim 1, wherein a center axis of the rotation shaft defines a first angle with respect to a ground surface that supports the cabinet, and wherein the circumferential rib defines a second angle with respect to the center axis of the rotation shaft, the second angle being greater than the first angle.

15. The laundry treating apparatus of claim 1, wherein the outer circumferential surface of the extension is defined by (i) the outer circumferential surface of the circumferential rib and (ii) an outer circumferential surface of the reinforcing portion.

* * * * *